(12) United States Patent
Chen et al.

(10) Patent No.: US 7,760,692 B2
(45) Date of Patent: Jul. 20, 2010

(54) PERFORMANCE OPTIMIZATION FOR WIRELESS NETWORKS WITH MIXED MODULATION TYPES

(75) Inventors: Tania Sung-Yi Chen, Sunnyvale, CA (US); Bretton Douglas, San Jose, CA (US); Arnold Bilstad, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1200 days.

(21) Appl. No.: 10/837,864

(22) Filed: May 3, 2004

(65) Prior Publication Data

US 2005/0243860 A1 Nov. 3, 2005

(51) Int. Cl.
*H04W 4/00* (2009.01)
(52) U.S. Cl. .................. 370/338; 370/437; 370/431
(58) Field of Classification Search ........... 455/450, 455/422.1, 452.1, 452.2, 453, 454; 370/338, 370/431, 437, 465, 466, 468, 469
See application file for complete search history.

(56) References Cited

U.S. PATENT DOCUMENTS

| 6,950,628 B1 * | 9/2005 | Meier et al. ............ 455/41.2 |
| 7,039,417 B2 * | 5/2006 | Lyle et al. ............ 455/452.2 |
| 7,136,655 B2 * | 11/2006 | Skafidas et al. ............ 455/450 |
| 2003/0169763 A1 * | 9/2003 | Choi et al. .................. 370/462 |
| 2004/0052227 A1 * | 3/2004 | Judd et al. .................. 370/334 |
| 2004/0102222 A1 * | 5/2004 | Skafidas et al. .......... 455/562.1 |
| 2004/0121749 A1 * | 6/2004 | Cui et al. ................. 455/226.1 |
| 2008/0019342 A1 * | 1/2008 | Thermond et al. .......... 370/338 |

OTHER PUBLICATIONS

IEEE Std 802.11g™—2003, (Amendment to IEEE Std 802.11™, 199 Edition), IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Datat Rate Extension in the 2.4 GHz Band, IEEE Computer Society, 78 pages.

* cited by examiner

*Primary Examiner*—Ajit Patel
*Assistant Examiner*—Khai M Nguyen
(74) *Attorney, Agent, or Firm*—Cindy Kaplan

(57) ABSTRACT

Significant improvements in throughput of networks employing disparate physical layer standards are provided. Different physical layer standards are segregated into different frequency channels. In one implementation, 802.11b traffic and 802.11g traffic are segregated into different frequency channels. A network management tool allows the user to specify channels to either, e.g., 802.11b-only, 802.11g-only, 802.11b preferred and 802.11g discouraged, or 802.11g preferred and 802.11b discouraged. Access points are given the capability of preventing or discouraging client traffic of either given type.

13 Claims, 11 Drawing Sheets

PERFORMANCE OPTIMIZATION FOR WIRELESS NETWORKS WITH MIXED MODULATION TYPES

STATEMENT OF RELATED APPLICATIONS

The present invention is related to the subject matter of U.S. patent application Ser. No. 10/791,466, filed on Mar. 1, 2004, and entitled QUALITY EVALUATION FOR WIRELESS COMMUNICATION NETWORKS. The contents of the application are incorporated herein by reference in their entirety for all purposes.

BACKGROUND OF THE INVENTION

The present invention is related to wireless networking. The IEEE 802.11b standard has been widely adopted for use in wireless local area networks. In a typical 802.11b network, clients such as user PCs and laptops wirelessly communicate with access points linked to a fixed wired infrastructure. Such 802.11b access points and clients are widely deployed in homes, retail stores, hospitals, educational institutions, businesses, etc. The 802.11b standard exploits spectrum at 2.4 GHz and achieves a maximum physical layer data rate of 11 Mbps.

To increase data rate, a new standard has been developed, 802.11g. While 802.11b employs direct sequence spread spectrum (DSSS) and Complimentary Code Keying (CCK), the 802.11g standard employs orthogonal frequency division multiplexing (OFDM). The 802.11g standard is advantageous in that data rates as high as 54 Mbps are available. The 802.11g devices employ the same spectrum as the 802.11b devices. Accordingly, the IEEE 802.11 standards body incorporated certain features in the 802.11 g standard to ensure that 802.11g devices are backwards compatible with 802.11b devices and that the two standards can coexist successfully.

Despite the backward compatibility and coexistence features inherent in the 802.11g standard, there are nonetheless several compatibility problems that degrade the throughput of wireless networks where the two types of devices are mixed. 802.11g-capable access points and clients are also capable of 802.11b operation. However, legacy 802.11b-only devices have no capability of transmitting or receiving 802.11g OFDM signals. Compatibility problems include the following:

802.11b-only clients cannot detect 802.11g OFDM transmissions. An 802.11b radio may therefore attempt to transmit during a current 802.11g OFDM transmission thus causing a collision. To prevent this type of collision, the 802.11g standard provides for a protection mode to be used by 802.11g-capable radios whenever one or more 802.11b-only radios are in the vicinity. In the protection mode the g-capable radios precede their transmissions with an RTS/CTS (request to send/clear to send) exchange or a CTS message transmission. The RTS and/or CTS messages are sent using the 802.11b modulation scheme and serve the purpose of notifying the 802.11b radio that the medium will be busy for a specified time. These messages, however, add a relatively large amount of overhead reducing wireless throughput. In a multiple access point network, a single b-only client can degrade throughput in multiple cells due to either collisions or the measures that need to be taken to prevent them.

Another problem is that g-capable clients can associate to b-only access points even when g-capable access points are nearby. The b-only access point may be selected, for example, because it has a higher received signal strength. Throughput is lost here because rather then sending data at 54 Mbps to and from the g-capable access point, the g-capable client will only send data at 11 Mbps to and from the b-only access point.

Single-cell simulations have been performed to examine the throughput for network scenarios providing only b-only clients, only g-capable clients, and mixed scenarios that incorporate both b-only clients and g-capable clients. The following table shows throughput possible within a single cell on a single channel evaluated at the medium access contention layer.

| CONFIGURATION | SINGLE CELL THROUGHPUT |
| --- | --- |
| All 802.11b clients | 6 Mbps |
| All 802.11g clients | 22 Mbps |
| Mixed 802.11g and 802.11b clients | 7 Mbps |

It will then be seen that simply replacing an 802.11b access point with an 802.11g-capable access point and replacing a majority of 802.11b-only clients with 802.11g-capable clients provides very little improvement to network throughput.

What is needed are systems and methods for significantly improving the throughput of networks that employ mixed modulation types such as 802.11 g and 802.11b.

SUMMARY OF THE INVENTION

Embodiments of the present invention provide significant improvements in throughput of networks employing disparate physical layer standard. Different physical layer standards are segregated into different frequency channels. In one implementation, 802.11b traffic and 802.11g traffic are segregated into different frequency channels. A network management tool allows the user to specify channels to either, e.g., 802.11b-only, 802.11g-only, 802.11b preferred and 802.11g discouraged, or 802.11g preferred and 802.11b discouraged. Access points are given the capability of preventing or discouraging client traffic of either given type.

A first aspect of the present invention provides a method for operating a wireless network having two physical layer standards. The method includes: for each of a plurality of channels, selecting one of a plurality of operating modes, the operating modes comprising: exclusive use of a first physical layer standard, exclusive use of a second physical layer standard, preferred use of the first physical layer standard and discouraged use of the second physical layer standard, and discouraged use of the first physical layer standard and preferred use of the second physical layer standard; and operating at least one access point to communicate with clients in accordance with the selections.

A second aspect of the present invention provides a method for operating an access point capable of employing first and second physical layer standards. The method includes: for a selected channel, configuring an operating mode wherein the first physical layer standard is to be employed exclusively for communication of data frames; and preventing communication of data frames on the selected channel in accordance with the second physical layer standard.

A third aspect of the present invention provides a method for operating an access point capable of employing first and second physical layer standards. The method includes: for a selected channel, configuring an operating mode wherein the first physical layer standard is to be preferred for communication of data frames and the second physical layer standard is to be discouraged; and discouraging data communication on the selected channel in accordance with the second physical layer standard.

Further understanding of the nature and advantages of the inventions herein may be realized by reference to the remaining portions of the specification and the attached drawings.

DESCRIPTION OF SPECIFIC EMBODIMENTS

Figure 1A:
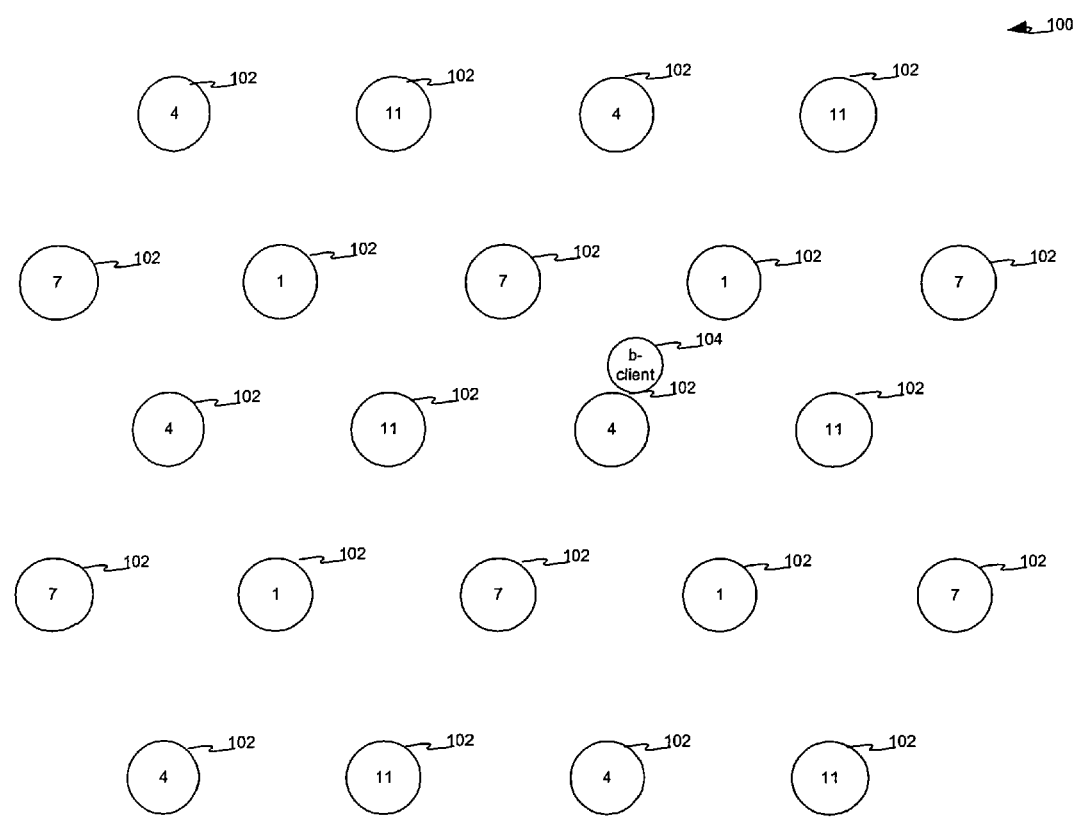
FIG. 1A depicts an example of a mixed modulation-type wireless network to which embodiments of the present invention can be applied.

FIG. 1A depicts a representative mixed modulation type network 100 to which embodiments of the present invention may be applied. Access points 102 are capable of communication in the 2.4 GHz band using either the 802.11b or 802.11 g standard. The access points of network 100 are connected to a wired infrastructure or to a separate wireless bridge network. Each access point is assigned to one of four channels: 1 (2.412 GHz), 4 (2.427 GHz), 7 (2.442 GHz) or 11 (2.462 GHz). Network 100 employs a reuse scheme, assigning frequencies to access points in a spatial pattern to minimize interference.

Clients capable of using either 802.11b or 802.11 g are referred to herein as g-capable clients whereas clients capable of only 802.11b operation are referred to as b-only clients. The 802.11b and 802.11 g standard documents and amendments thereof are incorporated herein by reference in their entirety for all purposes.

In one scenario indicative of the type of problem that embodiments of the present invention address there are numerous 802.11g-capable clients (not shown) and a single 802.11b-only client 104. The 802.11b-only client has associated to a nearby access point on channel 4. If a 6 Mbps beacon data rate is employed by access points 102, the nearest channel 4 access point to client 104 will be forced into protection mode. If a 1 Mbps beacon data rate is used, then all of the channel 4 access points will be in range and forced into protection mode. As previously explained, the use of protection mode forces the MAC layer data rate from 22 Mbps to 7 Mbps.

It will be appreciated that network 100 is merely representative. Also, the present invention is not limited to 802.11b and 802.11g as the operative physical layer standards. Embodiments of the present invention may be applied to other mixed standards networks as may result from the use of emerging and anticipated physical layer standards such as, e.g., 802.11n, 802.11superG, 802.11g+, proprietary pre-standard versions of 802.11n, etc.

Apart from the access point and clients of network 100, there is a network management work station, a computer configured to run network management software according to embodiments of the present invention. The network management workstation can communicate with the access points and configure various 802.11 operation parameters of the access points. Channel assignments and operating mode assignments, as described herein, may be made under control of the network management workstation.

According to embodiments of the present invention, the network management workstation may also select one of a number of operation modes for each access point to use on its assigned channel as will now be explained. The operating modes include: permissive access for either 802.11g or 802.11b, exclusive use of 802.11g, exclusive use of 802.11b, preferred use of 802.11g and discouraged use of 802.11b, and preferred use of 802.11g and discouraged use of 802.11b. Essentially, the channels in use are divided between 802.11b and 802.11g operation with the option to either strictly preclude operation of the disfavored type or discourage operation of the disfavored type. It will be appreciated that what is being prevented or discouraged is the communication of 802.11 data frames. Some communication of 802.11 communication management frames is a part of the implementation of the scheme.

Allocating channel usage in this way has been found to be highly advantageous in improving network throughput. Consider a few representative scenarios.

Consider a network that employs four channels (1, 4, 7, and 11) and four cells. If 802.11b traffic and 802.11g traffic is mixed on all four of these channels, the following network throughputs can be expected as measured at the MAC layer:

802.11b and 802.11g on channel 1 cell-7 Mbps
802.11b and 802.11g on channel 4 cell-7 Mbps
802.11b and 802.11g on channel 7 cell-7 Mbps
802.11b and 802.11g on channel 11 cell-7 Mbps Thus the total MAC throughput is 28 Mbps for the four cells.

However, if there is sufficient 802.11g traffic to justify reserving a channel for exclusive 802.11g operation and 802.11b devices are directed to refrain from transmitting on that channel, the following network throughputs will be achieved:

802.11b and 802.1 μg on channel 1 cell-7 Mbps
802.11b and 802.11g on channel 4 cell-7 Mbps
802.11b and 802.11g on channel 7 cell-7 Mbps
802.11g only on channel 11 cell-22 Mbps Thus a total throughput of 43 Mbps is achieved in four cells.

If sufficient OFDM traffic exists to justify the allocation of two channels for 802.11g and 802.11b devices are directed to stay off of both of those channels, the following network throughputs can be achieved:

802.11b and 802.1 μg on channel 1 cell-7 Mbps
802.11b and 802.11g on channel 4 cell-7 Mbps
802.11g on channel 7 cell-22 Mbps
802.11g only on channel 11 cell-22 Mbps A total throughput of 58 Mbps is achieved. Thus it will be seen that network throughput can be doubled if two of the four channels can be reserved for the 802.11g traffic.

Figure 1B:
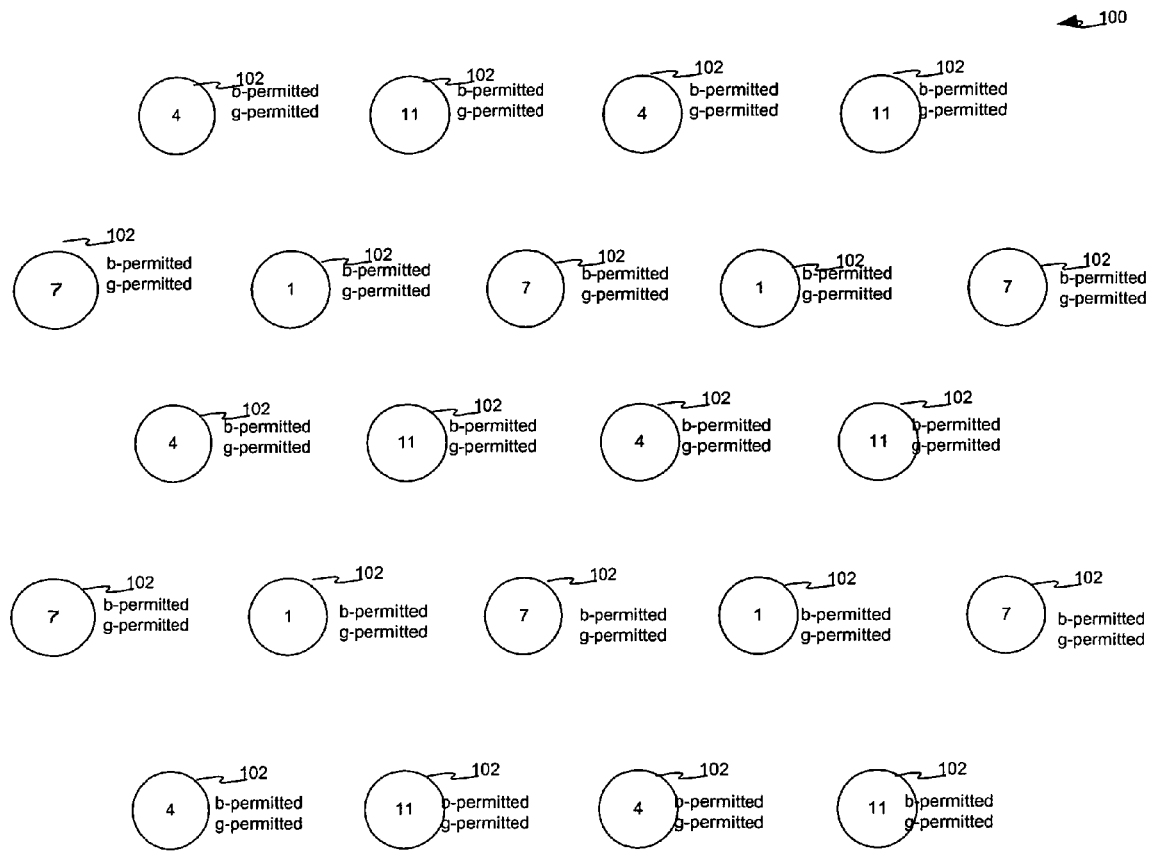
FIGS. 1B-1E depict various access point configurations that can be applied to the network of FIG. 1A according to one embodiment of the present invention.

A few channel allocation scenarios based on actual traffic models will now be discussed. The scenarios will be discussed with reference to example network 100. In a first example scenario depicted in FIG. 1B, 90% of the clients are 802.11b clients and 10% are 802.11g clients. There are thus an insufficient number of 802.11 g clients to justify allocating a channel for 802.11g traffic. The optimal policy is to then configure all of the access points to allow both 802.11b and 802.11g clients to associate. The network should be optimized for 802.11b performance such that transmission powers are optimized to maximize coverage at the top 802.11b data rate while minimizing contention between access points. The access points should be configured to support all 802.11b and 802.11g data rates. A throughput of 6 Mbps is expected on each of access points 102.

Figure 1C:
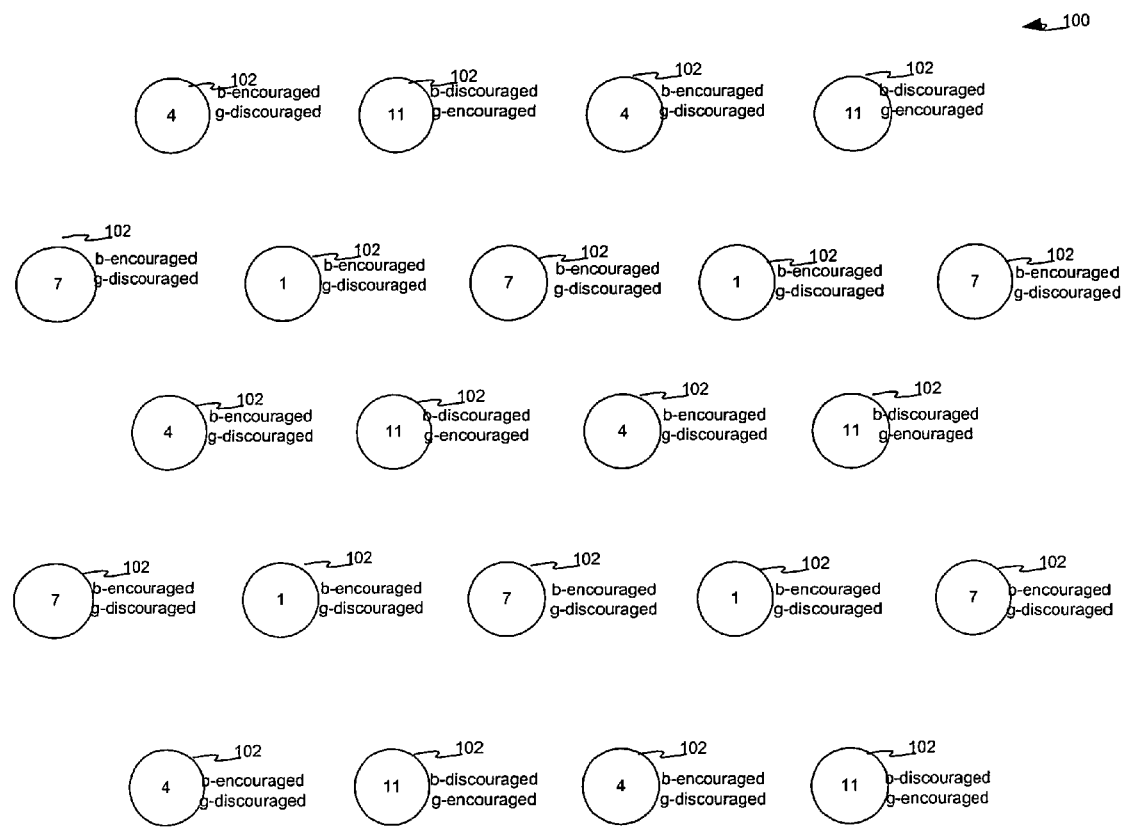

In another scenario depicted in FIG. 1C, 50% of the clients are 802.11b-only and 50% are 802.11g-capable. It is now desirable to reserve one channel for 802.11 g-only traffic. The access points on channels 1, 4, and 7 are configured to encourage b-only clients to associate and discourage g-capable from associating. The access points on channel 11 are configured to discourage b-only clients from associating and encourage g-capable clients to associate. One then expects a throughput of 6 Mbps on each access point assigned to channels 1, 4, and 7, and 22 Mbps on each access point assigned to channel 11 due to the use of 802.11g on that channel.

Figure 1D:
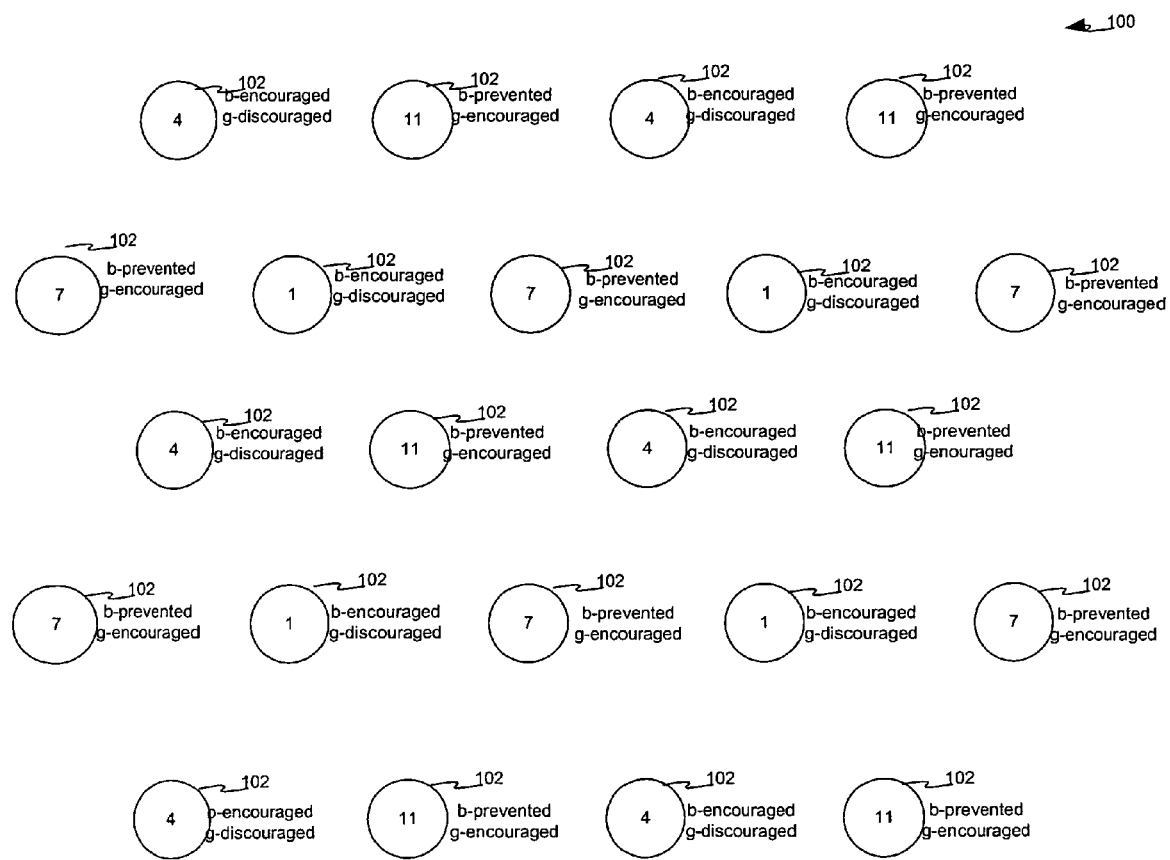

In a third scenario depicted in FIG. 1D, 25% of the clients are 802.11b-only and 75% are 802.11g-capable. Two channels will now be reserved for 802.11g-only traffic. Channels 1 and 4 will be configured to encourage association of b-only clients and discourage association of g-capable clients. Channel 7 and 11 will be configured to prevent 802.11b-only clients from associating and encourage 802.11g-capable clients to associate. The expected performance will be 6 Mbps throughput on access points assigned to channels 1 and 4 and 22 Mbps throughput on access points assigned to channels 7 and 11.

Figure 1E:
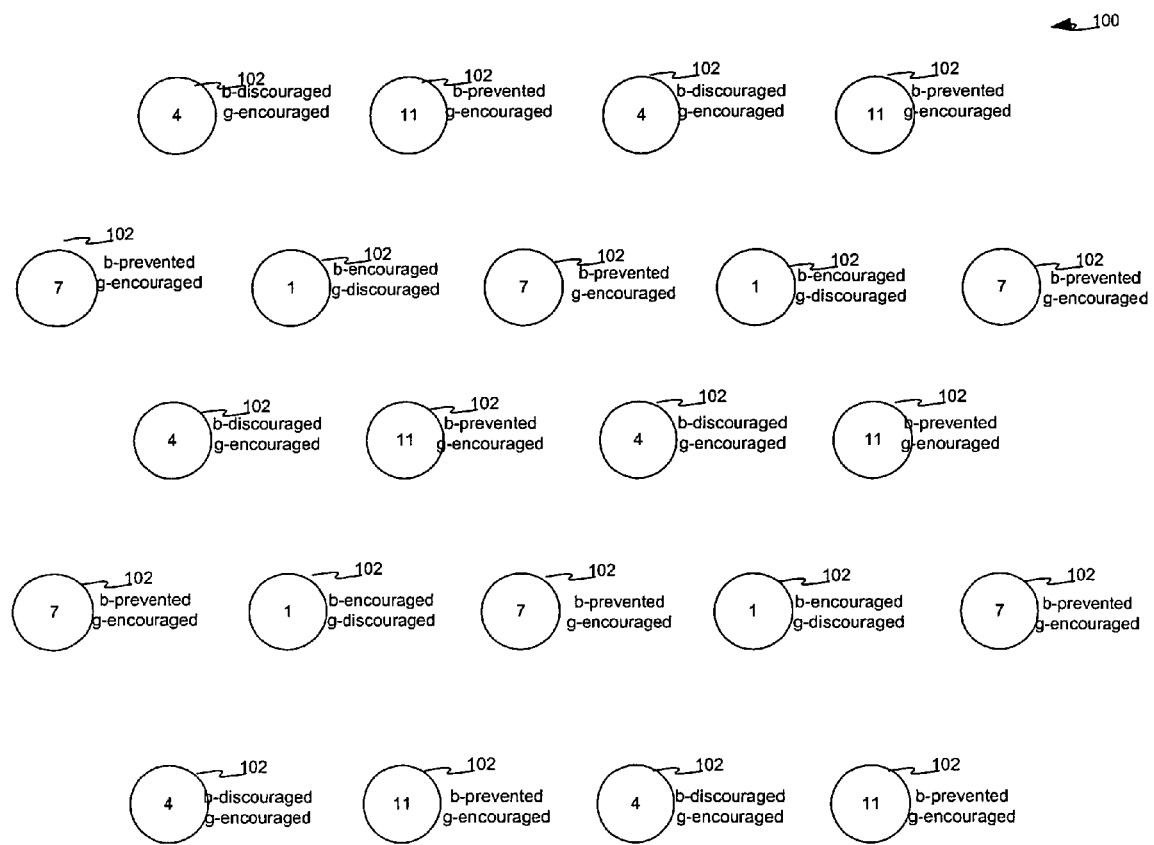

In a fourth scenario depicted in FIG. 1E, 10% of the clients are 802.11b-only and 90% are 802.11g-capable. Two channels will be configured to carry only 802.11g traffic, one channel will be configured such that 802.11g traffic is preferred, and one channel will be set up such that 802.11b traffic is preferred. The access points on channel 1 will be configured to encourage b-only clients to associate and discourage g-capable clients from associating. The access points on channel 4 are configured to discourage 802.11b-only clients from associating and encourage 802.11g-capable clients to associate. The access points on channels 7 and 11 are configured to prevent 802.11b-only clients from associating and to encourage 802.11g-capable clients to associate. Channel 1 access points will have an expected throughput of 6 Mbps. Channel 4 access points will have an expected throughput of either 7 or 22 Mbps. This will depend on whether all of the 802.11b-only clients are accommodated by channel 1 or if some spill over onto channel 4. If channel 4 effectively operates as an 802.11g-only channel then the throughput will be 22 Mbps while if it operates as a mixed channel the throughput will be only 7 Mbps. Channel 7 and 11, being g-only channels have throughputs of 22 Mbps on each access point.

How the access points implement the various operation modes will now be discussed. Multiple mechanisms will be described for each operation mode. Some mechanisms either benefit from or require vendor-specified client behavior. The various mechanisms can be used either singly or in combination for maximum effectiveness in implementing the desired operation mode.

Figure 2:
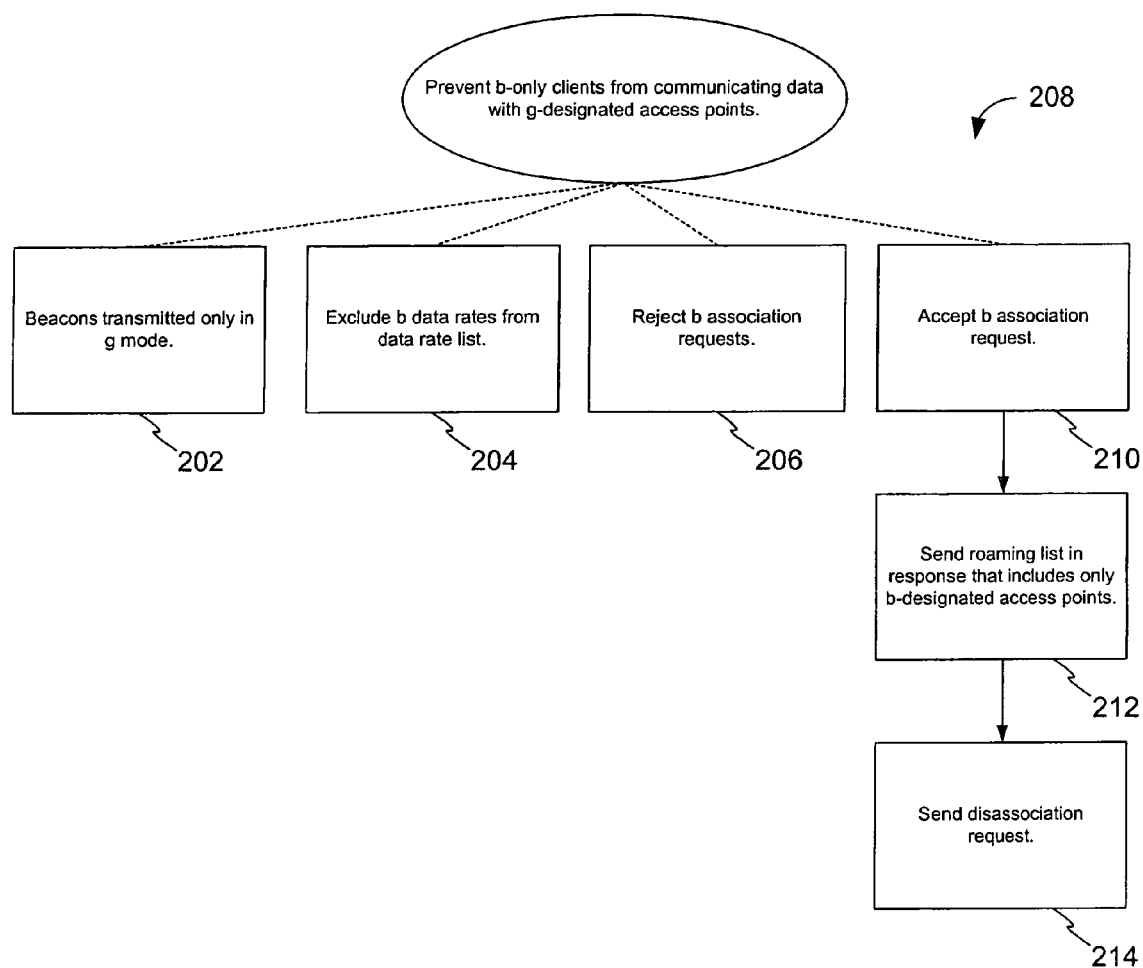
FIG. 2 depicts steps and processes to prevent b-only clients from communicating data frames with an access point on a channel assigned for 802.11g communications according to one embodiment of the present invention.

FIG. 2 depicts processes and steps for preventing 802.11b-only clients from communicating with an access point operating at a channel designated for only 802.11g communication. A first process 202 exploits the fact that 802.11 clients will generally only attempt to associate to an access point after hearing an 802.11 beacon frame from that access point. Accordingly, one way of preventing 802.11b-only clients from associating is to transmit the required beacon frames only in 802.11g OFDM mode and not in both modes as is typically done. An alternative to process 202 applies to situations where clients send 802.11 probe requests to find access points rather than listening for beacons. To prevent 802.11b communication, the access point does not respond to 802.11b probe requests as identified by the data rate list in the probe requests' supported rates information element.

At process 204 exploits the advertisement by the access point of available data rates as a part of the 802.11 association process. Typically an 802.11 association response frame will include an information element that indicates the data rates that are available at that access point. Alternatively, such a data rate list may be included within a vendor-specified management frame. To prevent 802.11b-only clients from associating, the 802.11b data rates, 1, 2, 5.5, and 11 Mbps are omitted even though the access point can in fact accommodate them. Instead only one or more of the 802.11g data rates are listed such as 6, 12, 24, 36, 48, and 54 Mbps. 802.11b-only clients will not associate with an access point that does not appear to support any of their own data rates.

A process 206 provides that 802.11b-only clients always have their association requests rejected. These clients are identified by the list of rates in the supported rates information element of their association requests. This is a simple way of preventing association by 802.11b clients.

The process 208 allows for temporary association by 802.11b-only clients but only for the limited purpose of informing them of access points configured to allow or encourage traffic from b-only clients. At step 210, the access point accepts the association request for the 802.11b-only client. To accept, the access point sends an association response frame. At step 212, the access point sends the new b-only client a roaming list that identifies access points configured to accept b-only traffic. This roaming list may be included in a vendor-specified information element included in the association response of step 210 or it may be included in a vendor-specified management frame. After the roaming list has been sent, the access point sends a disassociation request to the b-only client at step 214, leading to disassociation of the client. The client will react by attempting association with an access point on the roaming list.

Figure 3:
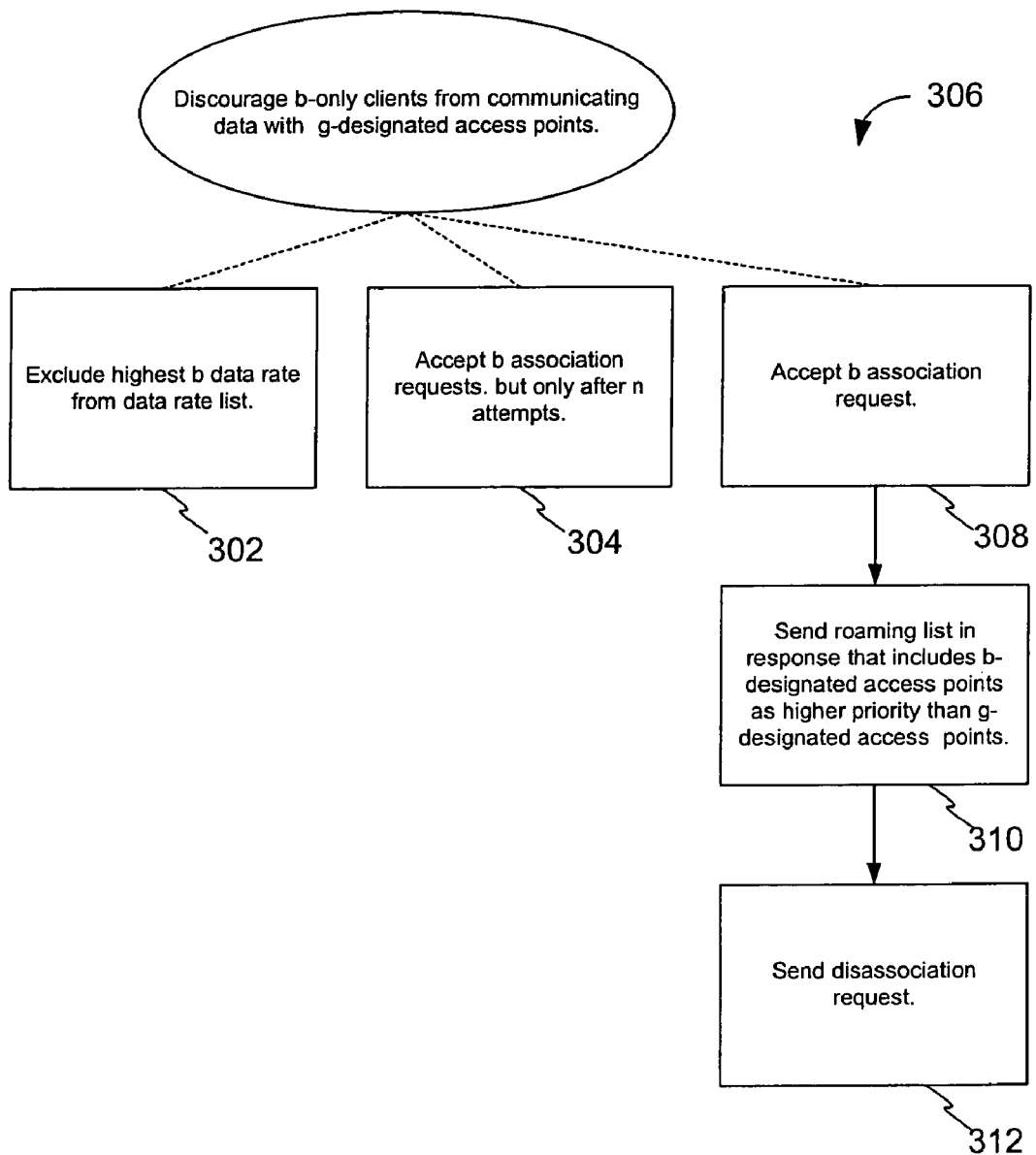
FIG. 3 depicts steps and processes to discourage 802.11b-only clients from communicating data frames with an access point on a channel assigned to 802.11g communication according to one embodiment of the present invention.

FIG. 3 depicts processes and steps for discouraging 802.11b-only clients from communicating with an access point configured to prefer 802.12g communication. A first process 302 makes use of the data rate list previously discussed with connection to FIG. 2. Instead of excluding all of the 802.11b data rates, only the highest 802.11b data rate, 11 Mbps is excluded. For process 302 to be effective, clients should observe a vendor-specified roaming behavior. According to this roaming behavior, a client searching for an access point will pick the access point offering it the highest data rate service. If a b-only client receives a data rate list that does not include the 11 Mbps rate, it will only associate to that access point if no other access point that offers 11 Mbps communication is available. The b-only client is thus able to associate but only if there are no reachable access points allocated to 802.11b communications.

A process 304 handles association requests in such a way to discourage 802.11b-only clients. Association requests from 802.11b-only client are accepted but only after N attempts where N is e.g., around 10. In this way, 802.11b-only clients are discouraged from associating since they will likely be able to associate to another access point where 802.11b traffic is encouraged using only a single attempt. For maximum effectiveness of process 304 a vendor-specified client roaming behavior should be defined where refusal of an association request leads to a further association request being sent to another available access point.

At process 306, like process 208 in FIG. 2, involves associating with the b-only client only for the limited purpose of sending a roaming list. At step 308, the access point accepts the association request from the b-only client by sending an appropriate association response frame. At a step 310, the access point sends a roaming list to the 802.11b-only client. The roaming list is ordered in priority. Access points configured to support 802.11b traffic are listed as being higher priority than 802.11g access points. This roaming list may be sent within a vendor-specified information element of the association response or within a vendor-specified management frame. At step 312, the access point sends the b-only client a disassociation request. Now the b-only client will attempt to roam to the access points on the roaming list, attempting association first with the higher priority b-designated access points.

Figure 4:
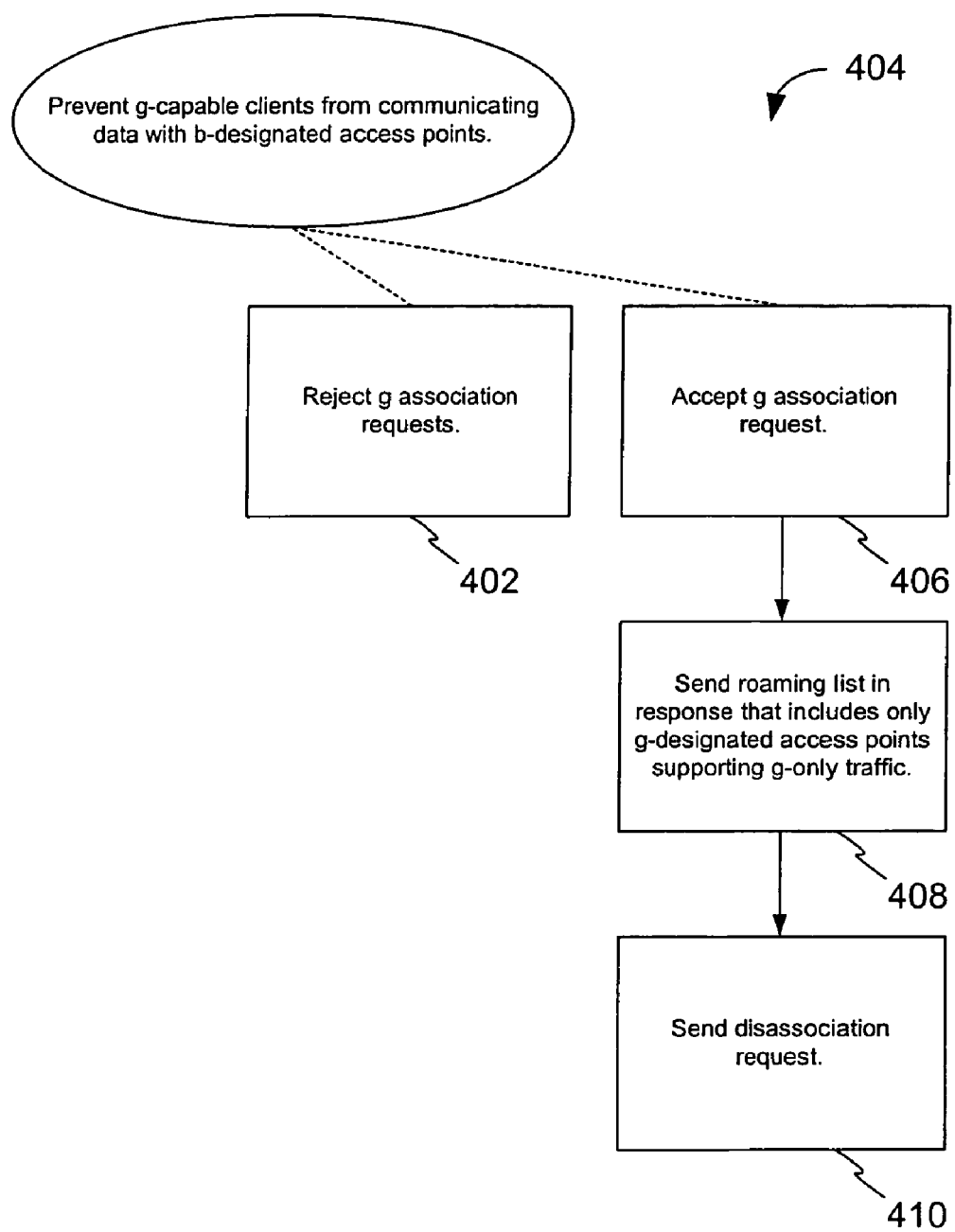
FIG. 4 depicts steps and processes to prevent 802.11g-capable clients from communicating data frames with an access point on a channel assigned to 802.11b communication according to one embodiment of the present invention.

FIG. 4 depicts processes and steps for preventing 802.11g-capable clients from communicating with access points that have been designated for 802.11b communication only. A process 402 simply rejects all association requests from 802.11g-capable clients. A process 404 is a counterpart to process 208 in FIG. 2. At step 406 accepts an association request from an 802.11g-cable client. In a step 408, the access point sends this client a roaming list that includes only access points designated for 802.11g traffic. Then at step 410, the access point sends the g-capable client a disassociation request. The g-capable client will then attempt to associate to one of the access points that has been designated for 802.11g traffic.

Figure 5:
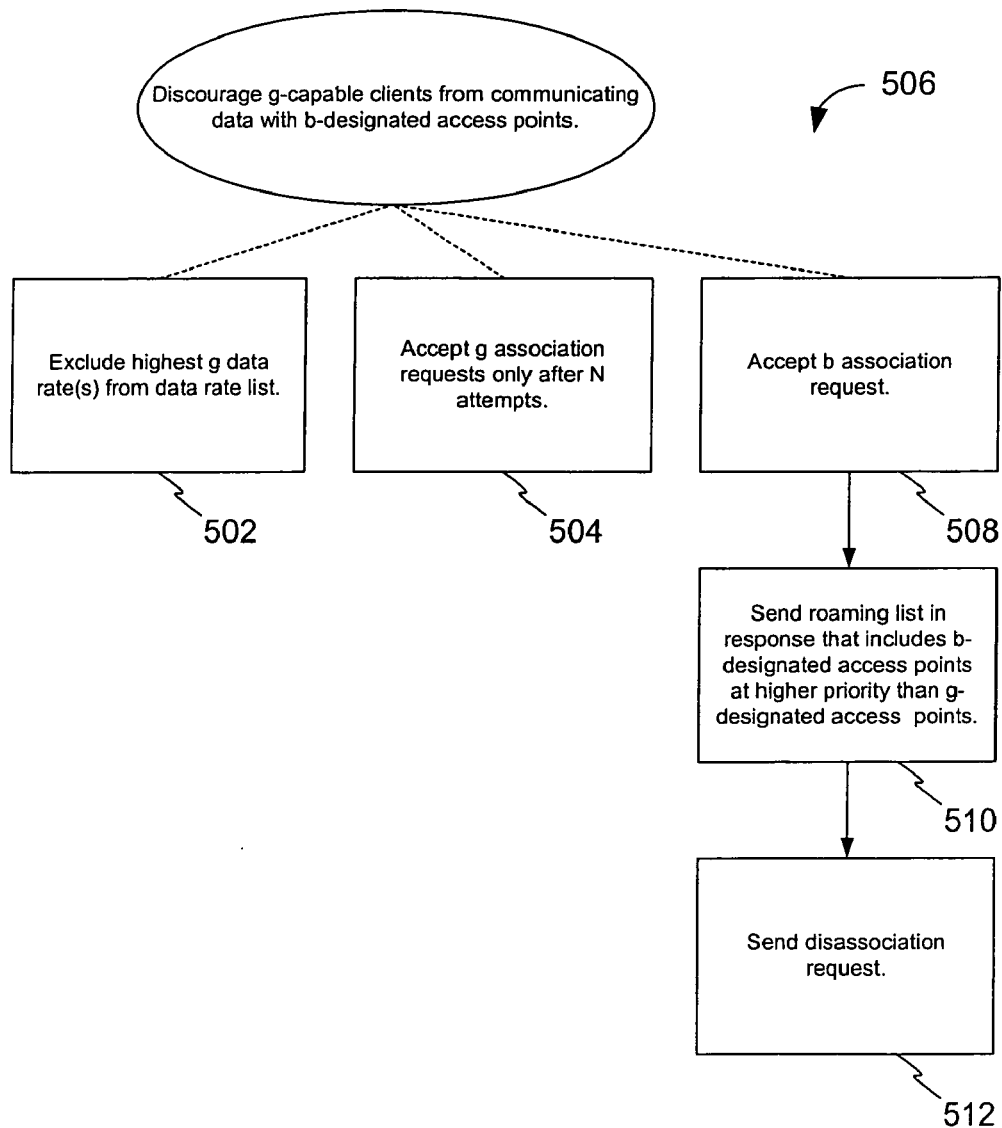
FIG. 5 depicts steps and processes to discourage 802.11g-capable clients from communicating data frames with an access point on a channel assigned to 802.11b communication according to one embodiment of the present invention.

FIG. 5 depicts processes and steps for discouraging g-capable clients from communicating with an access point designated for 802.11b communications. A process 502 involves modification of the data rate list. The data rate list presented in, e.g., beacon frames, will include all of the 802.11b data rates but will exclude the highest 802.11g data rates even if they are in fact a part of the access point's capabilities. For process 502 to be effective, there should be a vendor-specified roaming behavior that requires clients to first look for an access point that supports their highest data rate and if that fails, to associate to the access point having the highest power. The 802.11g-capable clients will use this access point employing process 502 only as a last resort since they will prefer to employ an access point that can support the highest 802.11g data rate.

A process 504 involves accepting association requests from g-capable clients but only after N attempts where N is e.g., around 10. If N attempts are received, this indicates that no g-designated access points are available. Process 504 is most effective when there is a vendor-specified roaming behavior where refusal of an association request leads to a further association request being sent to another available access point.

A process 506, analogous to process 506 in FIG. 4, involves temporarily associating with the g-capable client for the purpose of transmitting a roaming list. At step 508, the access point accepts the association request from an 802.11g-capable client. At step 510, the access point sends a roaming list to the g-capable client. The roaming list may be included within the association response frame or in a vendor-specified frame. The roaming list includes access points designated for 802.11g and access points designated for 802.11b. The 802.11b-designated access points are listed at a higher priority however. At step 512, the access point sends the g-capable client a disassociation request. Now the g-capable client will attempt to associate with access points on the transmitted roaming list starting with the g-designated access points.

Figure 6:
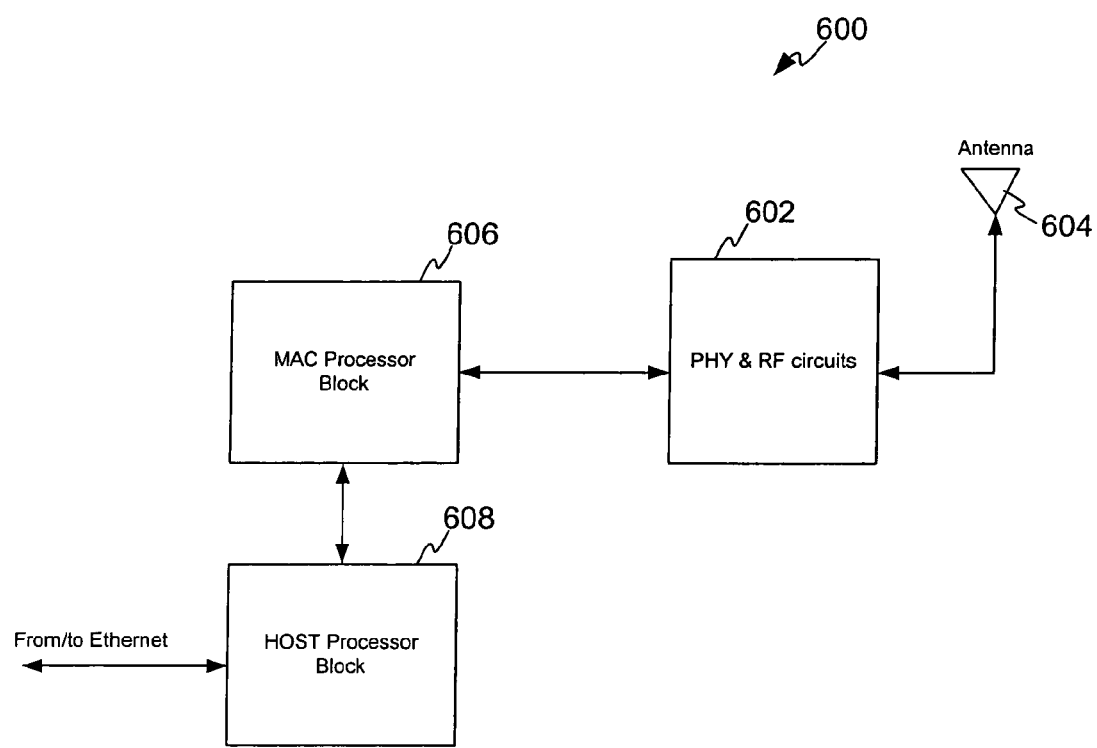
FIG. 6 depicts elements of an access point or client suitable for implementing embodiments of the present invention.

FIG. 6 depicts a block diagram of a typical client or access point 600 according to one embodiment of the present invention. A physical layer/RF block 602 transmits and receives signals via an antenna 604. Physical layer/RF block 602 incorporates circuitry to perform functions including modulation, demodulation, upconversion, downconversion, conversion between digital and analog, low noise amplification of received signals, and power amplification to be transmitted. Physical layer/RF block 602 operates in accordance with the relevant flavor of the IEEE 802.11 standard. A MAC layer processor 606 implements MAC layer functionality required by the 802.11 standard. A host processor block 608 performs overall control and exchanges data with a local network via an Ethernet connection. Operations according to the present invention will typically be performed by host processor block 608 and/or MAC processor block 606. Functionality of these two processor blocks may be incorporated within software that would be stored in a computer-readable storage medium such as, e.g., flash memory, other types of memory, hard drive, etc. Software for performing such functions may be transferred on a storage medium such as e.g., a floppy disc, CD-ROM, DVD ROM, a carrier signal, etc.

Figure 7:
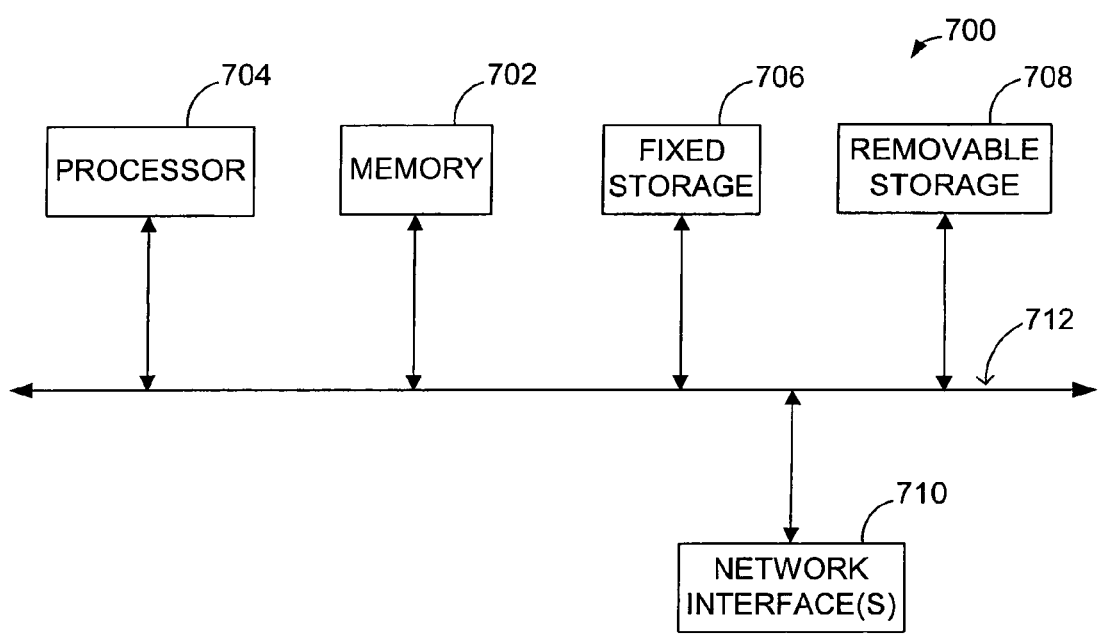
FIG. 7 depicts a computer system suitable for implementing embodiments of the present invention.

FIG. 7 shows a system block diagram of computer system 700 that may be used to execute software of embodiments of the present invention. Computer system 700 includes memory 702 which can be utilized to store and retrieve software programs incorporating computer code that implements aspects of the invention, data for use with the invention, and the like. Exemplary computer-readable storage media include CD-ROMs, floppy discs, tape, flash memories, system memories, and hard drives. Additionally, a data signal embodied in a carrier wave may be the computer-readable storage medium. Computer system 700 further includes subsystems such as central processor 704, fixed storage 706 and removable storage 708, and one or more network interfaces 710. Other computer systems suitable for use with the present invention may include additional or fewer subsystems. For example, computer system 700 may also incorporate a display for displaying results and/or a keyboard for accepting input.

The system bus architecture of computer system 700 is represented by arrows 712 in FIG. 7. However, these arrows are only illustrative of one possible interconnection scheme serving to link the subsystems. For example, a local bus may be utilized to connect the central processor 704 to the system memory 702. Computer system 700 shown in FIG. 7 is only one example of a computer system suitable for use with the invention. Other computer architectures having different configurations of subsystems may also be utilized. Computer system 700 may implement a network management tool as provided by embodiments of the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, in an alternative embodiment, access points autonomously measure the distribution of client types and vary their operating mode accordingly.

The invention claimed is:

1. A method for operating an access point capable of employing first and second physical layer standards, said method comprising:
   for a selected channel, configuring an operating mode wherein said first physical layer standard is to be employed exclusively for communication of data frames; and
   preventing communication of data frames on said selected channel in accordance with said second physical layer standard;
   wherein preventing comprises:
   accepting on said selected channel, an association request from a client capable of operating only in accordance with said second physical layer standard;
   sending said client on said selected channel, a roaming list specifying other access points configured to support data communication in accordance with said second physical layer standard in response to said association request; and
   sending a disassociation request to said client.

2. The method of claim 1 wherein said first physical layer standard corresponds to 802.11b operation and said second physical layer standard corresponds to 802.11g operation.

3. The method of claim 1 wherein said first physical layer standard corresponds to 802.11g operation and said second physical layer standard corresponds to 802.11b operation.

4. The method of claim 3 wherein preventing comprises:
   transmitting a list with permitted data rates, said list excluding all 802.11b data rates.

5. The method of claim 3 wherein preventing comprises:
   inhibiting transmission of 802.11b beacons.

6. The method of claim 1 wherein accepting said association request comprises sending an association response on said selected channel.

7. The method of claim 6 wherein said roaming list is provided in an information element in said association response.

8. Apparatus for operating an access point capable of employing first and second physical layer standards, said apparatus comprising:
   a processor that, for a selected channel, configures an operating mode wherein said first physical layer standard is to be employed exclusively for communication of data frames and prevents communication of data frames on said selected channel in accordance with said second physical layer standard;
   wherein said processor prevents by accepting on said selected channel, an association request from a client capable of operating only in accordance with said second physical layer standard, sending said client on said selected channel, a roaming list specifying other access points configured to support data communication in accordance with said second physical layer standard in response to said association request, and sending a disassociation request to said client.

9. The apparatus of claim 8 wherein said first physical layer standard corresponds to 802.11b operation and said second physical layer standard corresponds to 802.11 g operation.

10. The apparatus of claim 8 wherein said first physical layer standard corresponds to 802.11g operation and said second physical layer standard corresponds to 802.11b operation.

11. The apparatus of claim 8 wherein said processor prevents by transmitting a list with permitted data rates, said list excluding all 802.11b data rates.

12. The apparatus of claim 8 wherein said processor prevents by inhibiting transmission of 802.11b beacons.

13. The apparatus of claim 8 wherein said roaming list is provided in a management frame.

* * * * *